US011842745B2

(12) United States Patent
Lin et al.

(10) Patent No.: US 11,842,745 B2
(45) Date of Patent: Dec. 12, 2023

(54) METHOD, SYSTEM, AND COMPUTER-READABLE MEDIUM FOR PURIFYING VOICE USING DEPTH INFORMATION

(71) Applicant: GUANGDONG OPPO MOBILE TELECOMMUNICATIONS CORP., LTD., Guangdong (CN)

(72) Inventors: Yuan Lin, Palo Alto, CA (US); Jenhao Hsiao, Palo Alto, CA (US); Chiuman Ho, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 286 days.

(21) Appl. No.: 17/176,802

(22) Filed: Feb. 16, 2021

(65) Prior Publication Data
US 2021/0166696 A1    Jun. 3, 2021

Related U.S. Application Data

(63) Continuation of application No. PCT/CN2019/102061, filed on Aug. 22, 2019.
(Continued)

(51) Int. Cl.
*G10L 21/02* (2013.01)
*G10L 21/0216* (2013.01)
(Continued)

(52) U.S. Cl.
CPC ............ *G10L 21/0216* (2013.01); *G06N 3/04* (2013.01); *G06T 7/586* (2017.01); *G06V 10/764* (2022.01);
(Continued)

(58) Field of Classification Search
CPC ......... G10L 25/48; G10L 19/02; G10L 15/02; G10L 21/0208; G10L 21/0272; G10L 15/25; G10L 15/26
See application file for complete search history.

(56) References Cited

U.S. PATENT DOCUMENTS 5,680,481 A * 10/1997 Prasad .................... G06N 3/049
382/118
9,437,208 B2 * 9/2016 Sun ...................... G10L 21/0208
(Continued)

FOREIGN PATENT DOCUMENTS

CN    102314595 A    1/2012
CN    104823234 A    8/2015
(Continued)

OTHER PUBLICATIONS

Weninger, Felix, Florian Eyben, and Björn Schuller. "Single-channel speech separation with memory-enhanced recurrent neural networks." 2014 IEEE international conference on acoustics, speech and signal processing (ICASSP). IEEE, 2014. (Year: 2014).*
(Continued)

*Primary Examiner* — Mark Villena
(74) *Attorney, Agent, or Firm* — Young Basile Hanlon & MacFarlane, P.C

(57) ABSTRACT

In an embodiment, a method includes receiving a plurality of first images including at least a mouth-related portion of a human uttering a voice, wherein each first image has depth information; obtaining a noisy spectrogram including a first representation of the voice of the human; extracting a plurality of visual features using the first images, wherein one of the visual features is obtained using the depth information of a second image of the first images; extracting a plurality of audio features using the noisy spectrogram; determining a first spectrogram using the visual features and the audio features; subtracting the first spectrogram from the
(Continued)

noisy spectrogram, to obtain a purified representation of the voice of the human; and outputting, by an I/O-related outputting device, a response using the purified representation of the voice of the human.

20 Claims, 6 Drawing Sheets

Related U.S. Application Data

(60) Provisional application No. 62/723,174, filed on Aug. 27, 2018.

(51) Int. Cl.
```
G06T 7/586      (2017.01)
G06N 3/04       (2023.01)
G10L 15/22      (2006.01)
G10L 15/24      (2013.01)
G06V 10/764     (2022.01)
G06V 10/80      (2022.01)
G06V 10/82      (2022.01)
G06V 20/64      (2022.01)
G06V 40/20      (2022.01)
```
(52) U.S. Cl.
CPC .......... *G06V 10/803* (2022.01); *G06V 10/82* (2022.01); *G06V 20/64* (2022.01); *G06V 40/20* (2022.01); *G10L 15/22* (2013.01); *G10L 15/24* (2013.01); *G06T 2207/10024* (2013.01); *G06T 2207/10048* (2013.01); *G06T 2207/20084* (2013.01)

(56) References Cited

U.S. PATENT DOCUMENTS

2015/0058004 A1    2/2015   Dimitriadis et al.
2019/0005976 A1*   1/2019   Peleg .................. G06V 10/764

FOREIGN PATENT DOCUMENTS

| CN | 105721983 A | 6/2016 |
|----|-------------|--------|
| CN | 107223332 A | 9/2017 |
| CN | 107993671 A | 5/2018 |
| CN | 108346427 A | 7/2018 |

OTHER PUBLICATIONS

Afouras, Triantafyllos, Joon Son Chung, and Andrew Zisserman. "The conversation: Deep audio-visual speech enhancement." arXiv preprint arXiv:1804.04121 (2018). (Year: 2018).*

Yu, Jun, et al. "A multi-channel/multi-speaker interactive 3D audio-visual speech corpus in Mandarin." 2016 10th International Symposium on Chinese Spoken Language Processing (ISCSLP). IEEE, 2016. (Year: 2016).*

International Search Report, International application No. PCT/CN2019/102061, dated Nov. 25, 2019 (9 pages).

Extended European Search Report for EP Application 19853704.5 dated Sep. 13, 2021. (9 pages).

Chinese First Office Action with English Translation for CN Application 201980052488.3 dated Aug. 19, 2023. (16 pages).

Afouras et al., "The Conversation: Deep Audio-Visual Speech Enhancement", Visual Geometry Group, Department of Engineering Science, University of Oxford, UK, Jun. 19, 2018. (5 pages).

Karel Palecek, "Comparison of depth-based features for lipreading", 2015 38th International Conference on Telecommunications and Signal Processing (TSP), Oct. 12, 2015. (4 pages).

\* cited by examiner

METHOD, SYSTEM, AND COMPUTER-READABLE MEDIUM FOR PURIFYING VOICE USING DEPTH INFORMATION

CROSS-REFERENCE TO RELATED APPLICATION(S)

This application is a continuation-application of International (PCT) Patent Application No. PCT/CN2019/102061 filed on Aug. 22, 2019, which claims priorities to U.S. Provisional patent Application No. 62/723,174 filed on Aug. 27, 2018, the contents of both of which are herein incorporated by reference in their entireties.

TECHNICAL FIELD

The present disclosure relates to the field of speech enhancement, and more particularly, to a method, system, and computer-readable medium for purifying voice using depth information.

BACKGROUND

Voice purification is a speech enhancement or speech denoising technique which aims to separate, in a noisy audio, a voice of a human from background noises and voices of other humans in a same environment as the human. Visual information of the human that accompanies the noisy audio can be used for voice purification. Voice purification increases quality and/or intelligibility of the voice for humans and/or machines.

SUMMARY

An object of the present disclosure is to propose a method, system, and computer-readable medium for purifying voice using depth information.

In a first aspect of the present disclosure, a method includes: receiving, by at least one processor, a plurality of first images including at least a mouth-related portion of a human uttering a voice, wherein each first image has depth information; obtaining, by the at least one processor, a noisy spectrogram including a first representation of the voice of the human; extracting, by the at least one processor, a plurality of visual features using the first images, wherein one of the visual features is obtained using the depth information of a second image (that is, one of the first images) of the first images; extracting, by the at least one processor, a plurality of audio features using the noisy spectrogram; determining, by the at least one processor, a first spectrogram using the visual features and the audio features; subtracting, by the at least one processor, the first spectrogram from the noisy spectrogram, to obtain a purified representation of the voice of the human; and outputting, by an input/output (I/O)-related outputting device, a response using the purified representation of the voice of the human.

According to an embodiment in conjunction with the first aspect of the present disclosure, the one of the visual features is obtained using depth information of a tongue of the human in the depth information of the second image of the first images.

According to an embodiment in conjunction with the first aspect of the present disclosure, the method further includes: generating, by a camera, infrared light that illuminates the mouth-related portion when the human is uttering the voice; capturing, by the camera, the first images.

According to an embodiment in conjunction with the first aspect of the present disclosure, the step of receiving, by the at least one processor, the first images includes: receiving a plurality of image sets, wherein each image set includes a corresponding third image (that is,) of the first images (that is, a corresponding one of the first images), and a corresponding fourth image, and the corresponding fourth image has color information augmenting the depth information of the corresponding third image; and the step of extracting, by the at least one processor, the visual features includes: extracting the visual features using the image sets, wherein the one of the visual features is obtained using the depth information and the color information of a first image set of the image sets.

According to an embodiment in conjunction with the first aspect of the present disclosure, the one of the visual features is obtained using depth information of a plurality of fifth images (that is, two or more of the first images) of the first images.

According to an embodiment in conjunction with the first aspect of the present disclosure, the step of determining, by the at least one processor, the first spectrogram includes: determining a second representation using correlation between the visual features and the audio features.

According to an embodiment in conjunction with the first aspect of the present disclosure, the second representation is the first spectrogram; and the step of determining the second representation is performed by a recurrent neural network (RNN).

According to an embodiment in conjunction with the first aspect of the present disclosure, the second representation is an audio-visual representation; the step of determining the second representation is performed by an RNN; and the step of determining, by the at least one processor, the first spectrogram further includes: determining the first spectrogram using the second representation by a fully connected network.

In a second aspect of the present disclosure, a system includes: at least one memory, at least one processor, and an input/output (I/O)-related outputting device. The at least one memory is configured to store program instructions. The at least one processor is configured to execute the program instructions, which cause the at least one processor to perform steps including: receiving a plurality of first images including at least a mouth-related portion of a human uttering a voice, wherein each first image has depth information; obtaining a noisy spectrogram including a first representation of the voice of the human; extracting a plurality of visual features using the first images, wherein one of the visual features is obtained using the depth information of a second image of the first images; extracting a plurality of audio features using the noisy spectrogram; determining a first spectrogram using the visual features and the audio features; and subtracting the first spectrogram from the noisy spectrogram, to obtain a purified representation of the voice of the human. The I/O-related outputting device is configured to output a response using the purified representation of the voice of the human.

According to an embodiment in conjunction with the second aspect of the present disclosure, the one of the visual features is obtained using depth information of a tongue of the human in the depth information of the second image of the first images.

According to an embodiment in conjunction with the second aspect of the present disclosure, the system further includes: a camera configured to generate infrared light that illuminates the mouth-related portion when the human is uttering the voice; and capture, by the camera, the first images.

According to an embodiment in conjunction with the second aspect of the present disclosure, the step of receiving the first images includes: receiving a plurality of image sets, wherein each image set includes a corresponding third image of the first images, and a corresponding fourth image, and the corresponding fourth image has color information augmenting the depth information of the corresponding third image; and the step of extracting the visual features includes: extracting the visual features using the image sets, wherein the one of the visual features is obtained using the depth information and the color information of a first image set of the image sets.

According to an embodiment in conjunction with the second aspect of the present disclosure, the one of the visual features is obtained using depth information of a plurality of fifth images of the first images.

According to an embodiment in conjunction with the second aspect of the present disclosure, the step of determining the first spectrogram includes: determining a second representation using correlation between the visual features and the audio features.

According to an embodiment in conjunction with the second aspect of the present disclosure, the second representation is the first spectrogram; and the step of determining the second representation is performed by a recurrent neural network (RNN).

According to an embodiment in conjunction with the second aspect of the present disclosure, the second representation is an audio-visual representation; the step of determining the second representation is performed by an RNN; and the step of determining the first spectrogram further includes: determining the first spectrogram using the second representation by a fully connected network.

In a third aspect of the present disclosure, a non-transitory computer-readable medium with program instructions stored thereon is provided. When the program instructions are executed by at least one processor, the at least one processor is caused to perform steps including: receiving a plurality of first images including at least a mouth-related portion of a human uttering a voice, wherein each first image has depth information; obtaining a noisy spectrogram including a first representation of the voice of the human; extracting a plurality of visual features using the first images, wherein one of the visual features is obtained using the depth information of a second image of the first images; extracting a plurality of audio features using the noisy spectrogram; determining a first spectrogram using the visual features and the audio features; subtracting the first spectrogram from the noisy spectrogram, to obtain a purified representation of the voice of the human; and causing an input/output (I/O)-related outputting device to output a response using the purified representation of the voice of the human.

According to an embodiment in conjunction with the third aspect of the present disclosure, the one of the visual features is obtained using depth information of a tongue of the human in the depth information of the second image of the first images.

According to an embodiment in conjunction with the third aspect of the present disclosure, the steps performed by the at least one processor further includes: causing the camera to generate infrared light that illuminates the mouth-related portion when the human is uttering the voice and capture the first images.

According to an embodiment in conjunction with the third aspect of the present disclosure, the step of receiving the first images includes: receiving a plurality of image sets, wherein each image set includes a corresponding third image of the first images, and a corresponding fourth image, and the corresponding fourth image has color information augmenting the depth information of the corresponding third image; and the step of extracting the visual features includes: extracting the visual features using the image sets, wherein the one of the visual features is obtained using the depth information and the color information of a first image set of the image sets.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing a step, or a case in which the object is modified by at least one intervening step and the modified object is directly employed to perform the step.

Figure 1:
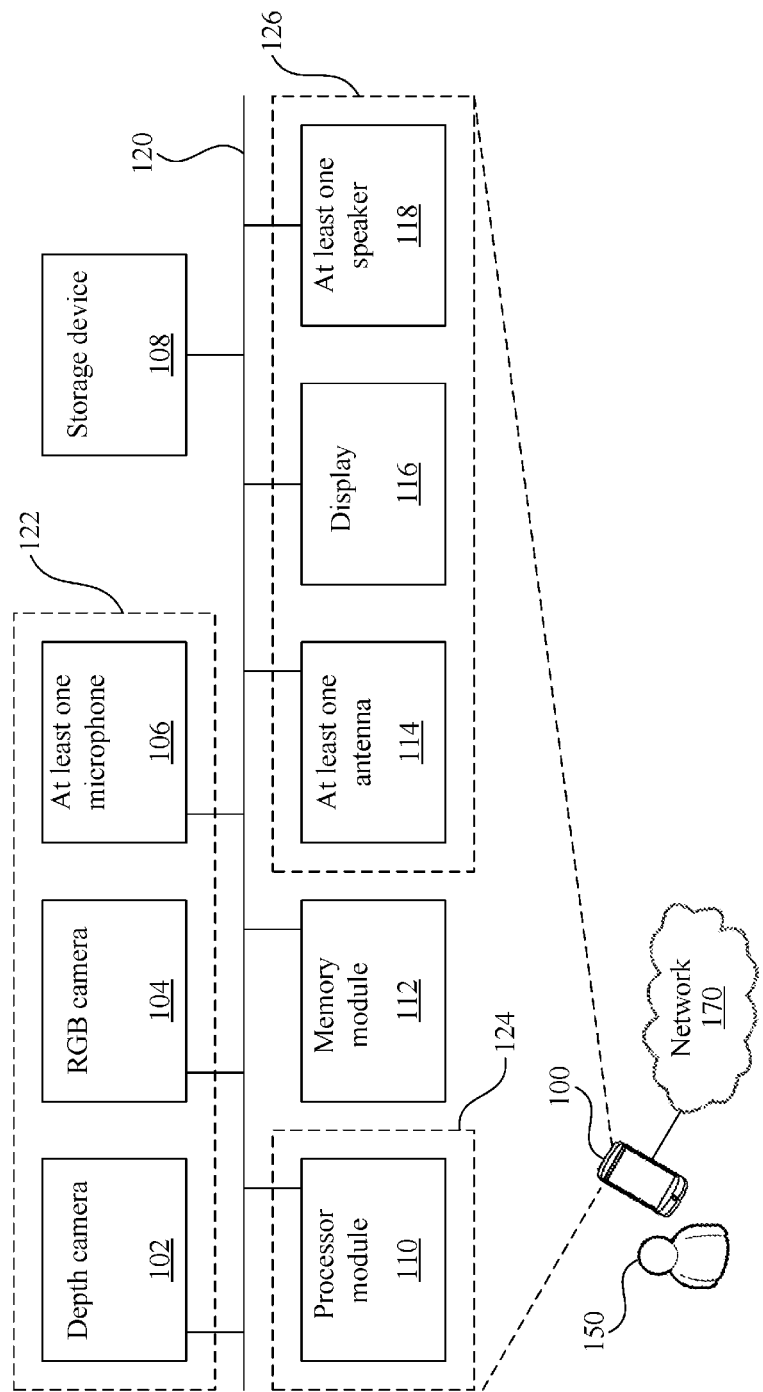
FIG. 1 is a diagram illustrating a mobile phone being used as a voice-related system by a human, and hardware modules of the voice-related system in accordance with an embodiment of the present disclosure.

FIG. 1 is a diagram illustrating a mobile phone 100 being used as a voice-related system by a human 150, and hardware modules of the voice-related system in accordance with an embodiment of the present disclosure. Referring to FIG. 1, the human 150 uses the mobile phone 100 to serve as the voice-related system that purifies a noisy audio for a voice of the human 150 using visual information and allows an audio for a purified voice of the human 150 to be used to generate a response of the input/output (I/O)-related outputting device 126. The mobile phone 100 includes a depth camera 102, an RGB camera 104, at least one microphone 106, a storage device 108, a processor module 110, a memory module 112, at least one antenna 114, a display 116, at least one speaker 118, and a bus 120. The voice-related system includes I/O-related inputting devices 122, a voice-related control device 124, and the I/O-related outputting devices 126, and is capable of using an alternative source, such as the storage device 108, or a network 170.

The depth camera 102 is configured to generate infrared light that illuminates at least a mouth-related portion of the human 150 when the human 150 uttering the voice, and capture a plurality of images $di_1$ to $di_t$ (shown in FIG. 2) including at least the mouth-related portion of the human 150 uttering the voice. Each of the images $di_1$ to $di_t$ has depth information and the depth information may further be augmented with luminance information. The depth camera 102 may be a time of flight camera, or a structured light camera. The RGB camera 104 is configured to capture a plurality of images $ri_1$ to $ri_t$ (shown in FIG. 2) including at least a mouth-related portion of the human 150 uttering the voice. Each of the images $ri_1$ to $ri_t$ has color information. The RGB camera 104 may alternatively be replaced by other types of color cameras such as a CMYK camera. The RGB camera 104 and the depth camera 102 may be separate cameras configured such that objects in the images $ri_1$ to $ri_t$ correspond to objects in the images $di_1$ to $di_t$. The color information in each image $ri_1, \ldots,$ or $ri_t$ augments the depth information in a corresponding image $di_1, \ldots,$ or $di_t$. The RGB camera 104 and the depth camera 102 may alternatively be combined into an RGBD camera. The RGB camera 104 may be optional.

The at least one microphone 106 is configured to produce a noisy audio from sounds in an environment. The noisy audio includes a time domain representation of the voice of the human 150, and may further include a time domain representation of voices of other humans and/or background noises in the environment.

The depth camera 102 and the RGB camera 104 serve as one of the I/O-related inputting devices 122 for visual input. Because the depth camera 102 uses the infrared light to illuminate the human 150, the I/O-related inputting device 122 allows the human 150 to be located in an environment with poor light condition. The at least one microphone 106 serves as another of the I/O-related inputting devices 122 for audio input. The visual input and the audio input may be used real-time, such as for making a phone call, making a video/voice chat, and speech dictation, or recorded and used later, such as for sending a video/voice message, and making a video/voice recording for an event. When the visual input and the audio input are recorded for later use, the voice-related control device 124 may not receive the visual input and the audio input directly from the I/O-related inputting devices 122, and may receive the visual input and the audio input from the alternative source such as the storage device 108 or a network 170.

The memory module 112 may be a non-transitory computer-readable medium that includes at least one memory storing program instructions executable by the processor module 110. The processor module 110 includes at least one processor that send signals directly or indirectly to and/or receives signals directly or indirectly from the depth camera 102, the RGB camera 104, the at least one microphone 106, the storage device 108, the memory module 112, the at least one antenna 114, the display 116, and at least one speaker 118 via the bus 120. The at least one processor is configured to execute the program instructions which configure the at least one processor as a voice-related control device 124. The voice-related control device 124 controls the I/O-related inputting devices 122 to generate the images $di_1$ to $di_t$, the images $ri_1$ to $ri_t$, and the noisy audio, or receive the images $di_1$ to $di_t$, the images $ri_1$ to $ri_t$, and the noisy audio from the alternative source, perform voice purification for the noisy audio using the images $di_1$ to $di_t$ and the images $ri_1$ to $ri_t$, and controls the I/O-related outputting devices 126 to generate a response based on a result of voice purification.

The at least one antenna 114 is configured to generate at least one radio signal carrying data directly or indirectly derived from the result of voice purification. The at least one antenna 114 serves as one of the I/O-related outputting devices 126. When the response is, for example, at least one cellular radio signal, the at least one cellular radio signal can carry, for example, voice data directly derived from the audio for the purified voice to make a phone call. When the response is, for example, at least one cellular radio signal or at least one Wi-Fi radio signal, the at least one cellular radio signal or the at least one Wi-Fi radio signal can carry, for example, video data directly derived from the images $di_1$ to $di_t$, the images $ri_1$ to $ri_t$, and the audio for the purified voice to make a video chat. When the response is, for example, at least one Wi-Fi radio signal, the at least one Wi-Fi radio signal can carry, for example, keyword data derived from the audio for the purified voice through speech recognition to dictate to the voice-related control device 124 to search the internet with the keyword.

The display 116 is configured to generate light directly or indirectly derived from the result of voice purification. The display 116 serves as one of the I/O-related outputting devices 126. When the response is, for example, light of an image portion of a video being displayed, the light of the image portion being displayed can be corresponding to an audio portion of the video for the purified voice. When the response is, for example, light of displayed images, the light of the displayed images can carry, for example, text being input to the mobile phone 100 derived from the audio for the purified voice through speech recognition.

The at least one speaker 118 is configured to generate sound directly or indirectly derived from the result of voice purification. The at least one speaker 118 serves as one of the I/O-related outputting devices 126. When the response is, for example, sound of an audio portion of the video for the purified voice, the sound is directly derived from the audio portion of the video for the purified voice.

The voice-related system in FIG. 1 is the mobile phone 100. Other types of voice-related systems such as a television conference system that does not integrate I/O-related inputting devices, a voice-related control device, and I/O-related outputting devices into one apparatus are within the contemplated scope of the present disclosure.

Figure 2:
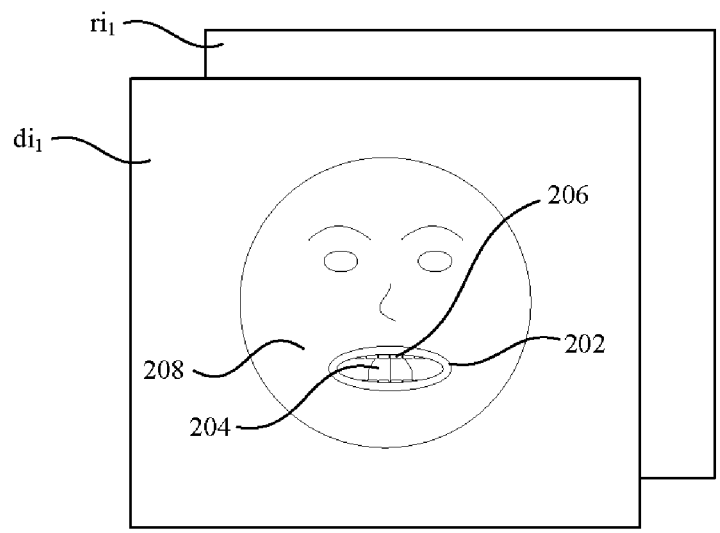
FIG. 2 is a diagram illustrating a plurality of images including at least a mouth-related portion of the human uttering a voice in accordance with an embodiment of the present disclosure.
Figure 2:
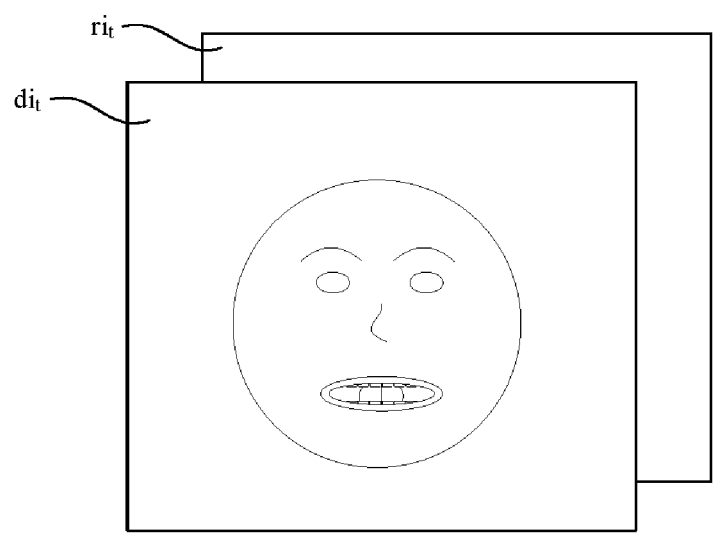

FIG. 2 is a diagram illustrating the images $di_1$ to $di_t$ and images $ri_1$ to $ri_t$ including at least the mouth-related portion of the human 150 (shown in FIG. 1) uttering the voice in accordance with an embodiment of the present disclosure. The images $di_1$ to $di_t$ are captured by the depth camera 102 (shown in FIG. 1). Each of the images $di_1$ to $di_t$ has the depth information. The depth information reflects how measured units of the at least the mouth-related portion of the human 150 are positioned front-to-back with respect to the human 150. The mouth-related portion of the human 150 includes a tongue 204. The mouth-related portion of the human 150 may further include lips 202, teeth 206, and facial muscles 208. The images $di_1$ to $di_t$ include a face of the human 150 uttering the voice. The images $ri_1$ to $ri_t$ are captured by the RGB camera 104. Each of the images $ri_1$ to $ri_t$ has color information. The color information reflects how measured units of the at least the mouth-related portion of the human 150 differ in color. For simplicity, only the face of the human 150 uttering the voice is shown in the images $di_1$ to $di_t$, and other objects such as other body portions of the human 150 and other humans are hidden.

Figure 3:
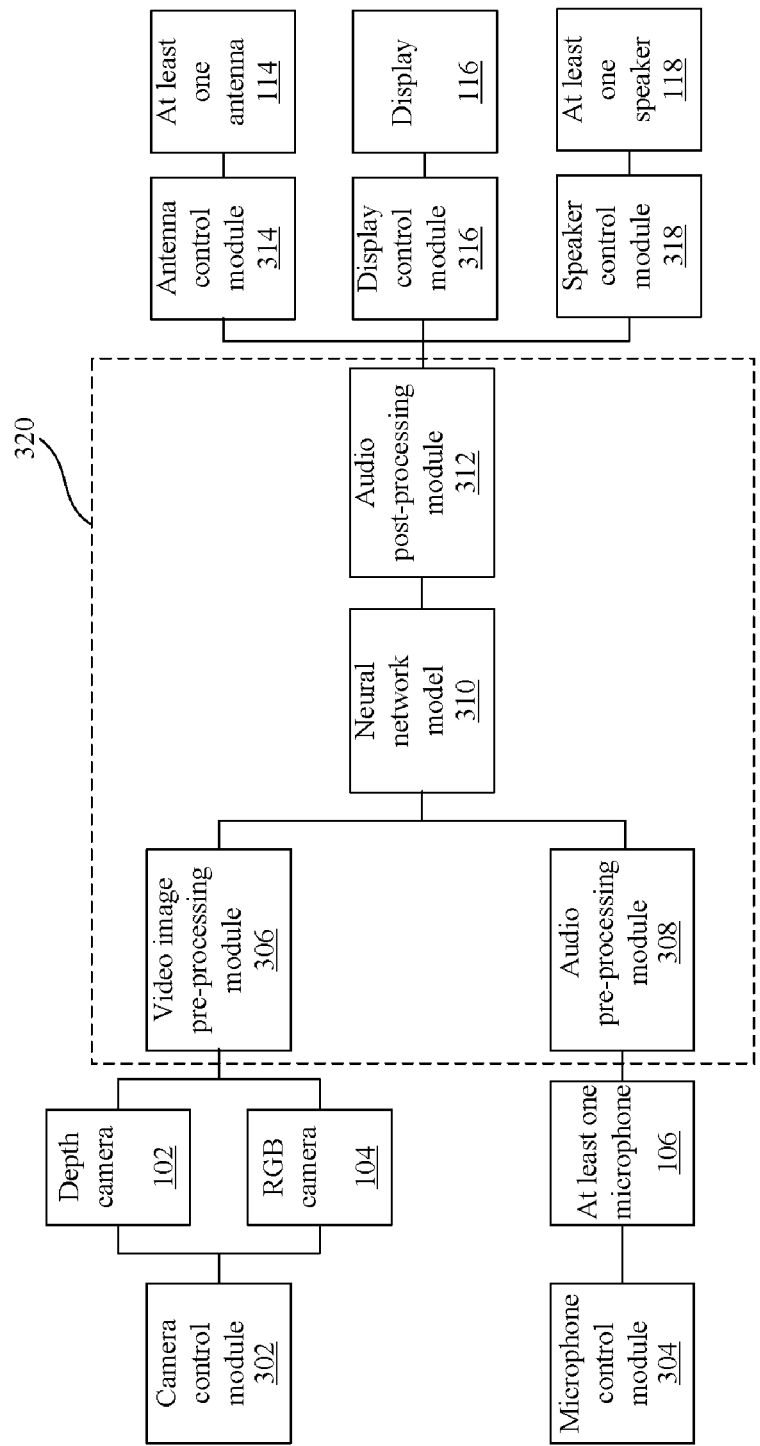
FIG. 3 is a block diagram illustrating software modules of a voice-related control device and associated hardware modules of the voice-related system in accordance with an embodiment of the present disclosure.

FIG. 3 is a block diagram illustrating software modules of the voice-related control device 124 (shown in FIG. 1) and associated hardware modules of the voice-related system in accordance with an embodiment of the present disclosure. The voice-related control device 124 includes a camera control module 302, a microphone control module 304, a voice purification module 320, an antenna control module 314, a display control module 316, and a speaker control module 318. The voice purification module 320 includes a video image pre-processing module 306, an audio pre-processing module 308, a neural network model 310, and audio post-processing module 312.

The camera control module 302 is configured to cause the depth camera 102 to generate the infrared light that illuminates the at least the mouth-related portion of the human 150 (shown in FIG. 1) when the human 150 uttering the voice, and capture the images $di_1$ to $di_t$ (shown in FIG. 2), and cause the RGB camera 104 to capture the images $ri_1$ to $ri_t$ (shown in FIG. 2). The microphone control module 304 is configured to cause the at least one microphone 106 to produce a noisy audio from sounds in an environment. The noisy audio includes the time domain representation of the voice of the human 150.

The voice purification module 320 is configured to perform voice purification for the noisy audio using the images $ri_1$ to $ri_t$ and the images $di_1$ to $di_t$. The noisy audio, the images $di_1$ to $di_t$, and the images $ri_1$ to $ri_t$ may be alternatively received from the storage device 108 or the network 170.

The video image pre-processing module 306 is configured to receive the images $di_1$ to $di_t$ from the depth camera 102, and the images $ri_1$ to $ri_t$ from the RGB camera 104 and perform steps including face detection and face alignment. In the face detection step, a face of the human 150 in a scene is detected for each of the images $di_1$ to $di_t$ and the images $ri_1$ to $ri_t$. In the face alignment step, detected faces are aligned with respect to a reference to generate a plurality of images $rdi_1$ to $rdi_t$ (shown in FIG. 4) with RGBD channels. The images $rdi_1$ to $rdi_t$ may include only the face of the human 150 uttering the voice and have a consistent size, or may include only a portion of the face of the human 150 uttering the voice and have a consistent size, through, for example, cropping and scaling performed during one or both of the face detection step and the face alignment step. The portion of the face spans from a nose of the human 150 to a chin of the human 150. Through resampling performed before, during, or after face detection and face alignment, a frame rate of the images $rdi_1$ to $rdi_t$ may become, for example, 25 fps.

The audio pre-processing module 308 is configured to receive the noisy audio from the at least one microphone 106 and perform steps including resampling and short-time Fourier transform (STFT). In the resampling step, the noisy audio is resampled to, for example, 16 kHz. In the STFT step, STFT is performed on resampled noisy audio to generate a noisy spectrogram 402 (shown in FIG. 4) including a frequency domain-related representation of the voice of the human 150. A Hann window may be used for STFT. A window size for the STFT is set to, for example, 640 samples, to correspond to a length of a single image $rdi_1$, . . . , or $rdi_t$. The noisy spectrogram 402 may be represented in a real-imaginary manner. Alternatively, the noisy spectrogram 402 may be represented in a magnitude-phase manner.

The neural network model 310 is configured to receive the images $rdi_1$ to $rdi_t$, and the noisy spectrogram 402, and outputs a denoised spectrogram 418 (shown in FIG. 4) including a purified frequency domain-related representation of the voice of the human 150 using deep learning.

The audio post-processing module 312 is configured to perform inverse short-time Fourier transform (ISTFT) on the denoised spectrogram 418 including the purified frequency domain-related representation of the voice of the human 150, to generate a denoised audio including a purified time domain representation of the voice of the human 150.

The antenna control module 314 is configured to cause the at least one antenna 114 to generate the response based on the result of voice purification which is the audio including the purified time domain representation of the voice. The display control module 316 is configured to cause the display 116 to generate the response based on the result of voice purification which is the audio including the purified time domain representation of the voice. The speaker control module 318 is configured to cause the at least one speaker 118 to generate the response based on the result of voice purification which is the audio including the purified time domain representation of the voice.

Figure 4:
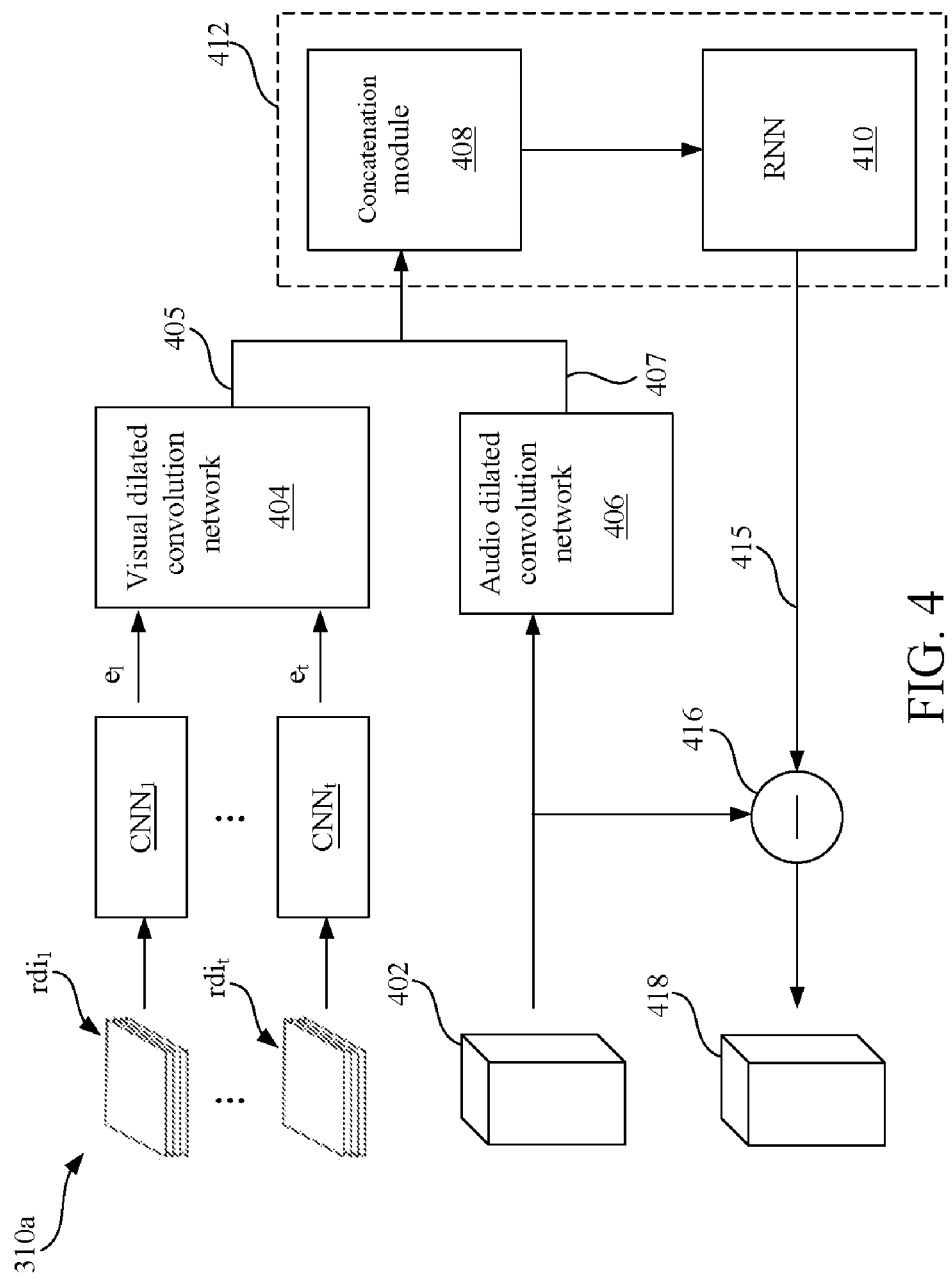
FIG. 4 is a block diagram illustrating a neural network model in a voice purification module in the voice-related system in accordance with an embodiment of the present disclosure.

FIG. 4 is a block diagram illustrating a neural network model 310a in the voice purification module 320 (shown in FIG. 3) in the voice-related system in accordance with an embodiment of the present disclosure. Referring to FIG. 4, the neural network model 310a includes a plurality of convolutional neural networks (CNNs) $CNN_1$ to $CNN_t$, a visual dilated convolution network 404, an audio dilated convolution network 406, an audio-visual fusion and correlation module 412, and a spectral subtraction module 416. The audio-visual fusion and correlation module 412 includes a concatenation module 408, and a recurrent neural network (RNN) 410.

Each of the CNNs $CNN_1$ to $CNN_t$ is configured to extract features from a corresponding image $rdi_1$, . . . , or $rdi_t$ of the images $rdi_1$ to $rdi_t$ and map the corresponding image $rdi_1$, . . . , or $rdi_t$ to a corresponding mouth-related portion embedding $e_1$, . . . , or $e_t$, which is a vector in a mouth-related portion embedding space. The corresponding mouth-related portion embedding $e_1$, . . . , or $e_t$ includes elements each of which is a quantified information of a characteristic of the mouth-related portion described with reference to FIG. 2. The characteristic of the mouth-related portion may be a one-dimensional (1D), two-dimensional (2D), or three-dimensional (3D) characteristic of the mouth-related portion. Depth information of the corresponding image $rdi_1$, . . . , or $rdi_t$ can be used to calculate quantified information of a 1D characteristic, 2D characteristic, or 3D characteristic of the mouth-related portion. Color information of the corresponding image $rdi_1$, . . . , or $rdi_t$ can be used to calculate quantified information of a 1D characteristic, or 2D characteristic of the mouth-related portion. Both the depth information and the color information of the corresponding image $rdi_1$, . . . , or $rdi_t$ can be used to calculate quantified information of a 1D characteristic, 2D characteristic, or 3D characteristic of the mouth-related portion. The characteristic of the mouth-related portion may, for example, be a shape or location of the lips 202, a shape or location of the tongue 204, a shape or location of the teeth 206, and a shape or location of the facial muscles 208. The location of, for example, the tongue 204 may be a relative location of the tongue 204 with respect to, for example, the teeth 206. The relative location of the tongue 204 with respect to the teeth 206 may be used to distinguish, for example, "leg" from "egg" in the voice. Depth information may be used to better track the deformation of the mouth-related portion while color information may be more edge-aware for the shapes of the mouth-related portion.

Each of the CNNs $CNN_1$ to $CNN_t$ includes a plurality of interleaved layers of convolutions (e.g., spatial or spatiotemporal convolutions), a plurality of non-linear activation functions (e.g., ReLU, PReLU), max-pooling layers, and a plurality of optional fully connected layers. Examples of the layers of each of the CNNs $CNN_1$ to $CNN_t$ are described in more detail in "FaceNet: A unified embedding for face recognition and clustering," Florian Schroff, Dmitry Kalenichenko, and James Philbin, *arXiv preprint arXiv:* 1503.03832, 2015. Alternative examples of the layers of each of the CNNs $CNN_1$ to $CNN_t$ are described in more detail in "Deep residual learning for image recognition," Kaiming He, Xiangyu Zhang, Shaoqing Ren, Jian Sun, In *IEEE Conference on Computer Vision and Pattern Recognition*, pp. 770-778, 2016.

The visual dilated convolution network 404 is configured to extract a plurality of high-level visual features 405 from the mouth-related portion embeddings $e_1$ to $e_t$ with temporal context of the mouth-related portion embeddings $e_1$ to $e_t$ taken into consideration. The high-level visual features 405 is a time sequence. The audio dilated convolution network 406 is configured to extract a plurality of high-level audio features 407 from the noisy spectrogram 402 with temporal context of the noisy spectrogram 402 taken into consideration. The high-level audio features 407 is a time sequence. Examples of the visual dilated convolution network 404 and the audio dilated convolution network 406 are described in more detail in "Looking to listen at the cocktail party: A speaker-independent audio-visual model for speech separation," Ariel Ephrat, Inbar Mosseri, Oran Lang, Tali Dekel, Kevin Wilson, Avinatan Hassidim, William T. Freeman, Michael Rubinstein, *arXiv preprint arXiv:*1804.03619, 2018.

The visual dilated convolution network 404 and the audio dilated convolution network 406 are optional. Alternatively, the mouth-related portion embeddings $e_1$ to $e_t$ are directly passed to the audio-visual fusion and correlation module 412. The mouth-related portion embeddings $e_1$ to $e_t$ are visual features extracted without taken temporal context of the images $rdi_1$ to $rdi_t$ into consideration. The audio dilated convolution network 406 is replaced by a regular convolution network. The regular convolution network is configured to extract audio features without taken temporal context of the noisy spectrogram 402 into consideration. The audio features are passed to the audio-visual fusion and correlation module 412.

The audio-visual fusion and correlation module 412 is configured to fuse and correlate the high-level visual features 405 and the high-level audio features 407. The concatenation module 408 is configured to perform audio-visual fusion by concatenating the high-level visual features 405 and the high-level audio features 407 correspondingly in time. The RNN 410 is configured to determine a first spectrogram 415 using correlation between the high-level visual features 405 and the high-level audio features 407. Each RNN unit of the RNN 410 receives corresponding concatenated high-level visual feature and high-level audio feature. The correlation between the high-level visual features 405 and the high-level audio features 407 is obtained by taking cross-view temporal context of the high-level visual features 405 and the high-level audio features 407 into consideration. A portion of the high-level audio features 407 uncorrelated with the high-level visual features 405 is reflected in the first spectrogram 415. The RNN 410 may be a bidirectional long short-term memory (LSTM) network including only one bidirectional LSTM layer, or a stack of bidirectional LSTM layers. Other types of RNNs such as a unidirectional LSTM, a bidirectional gated recurrent unit, a unidirectional gated recurrent unit are within the contemplated scope of the present disclosure.

The audio-visual fusion and correlation module 412 involves the RNN 410 with early fused high-level visual features 405 and high-level audio features 407 as input. Alternatively, the audio-visual fusion and correlation module 412 may involve separate RNNs correspondingly for the high-level visual features 405 and the high-level audio features 407, and a late fusing mechanism for fusing outputs from the separate RNNs. Still alternatively, the audio-visual fusion and correlation module 412 may be replaced by an audio-visual correlation module that involves a multi-view RNN without an early fusing mechanism or a late fusing mechanism.

The spectral subtraction module 416 is configured to subtract the first spectrogram 415 from the noisy spectrogram 402 to obtain a denoised spectrogram 418 including a purified frequency domain-related representation of the voice of the human 150. Examples of the method of the spectral subtraction module 416 are described in more detail in "Speech enhancement using spectral subtraction-type algorithms: A comparison and simulation study," Navneet Upadhyay, Abhijit Karmakar, *Procedia Computer Science* 54, 574-584, 2015.

The entire neural network model 310a may be trained by minimizing an $L_1$ loss between a ground truth complex spectrogram ($S_{groundtruth}$) and a predicted complex spectrogram ($S_{predicted}$). The overall optimization objective is defined as:

$$\mathcal{L} = \|S_{groundtruth} - S_{predicted}\|_1$$

Figure 5:
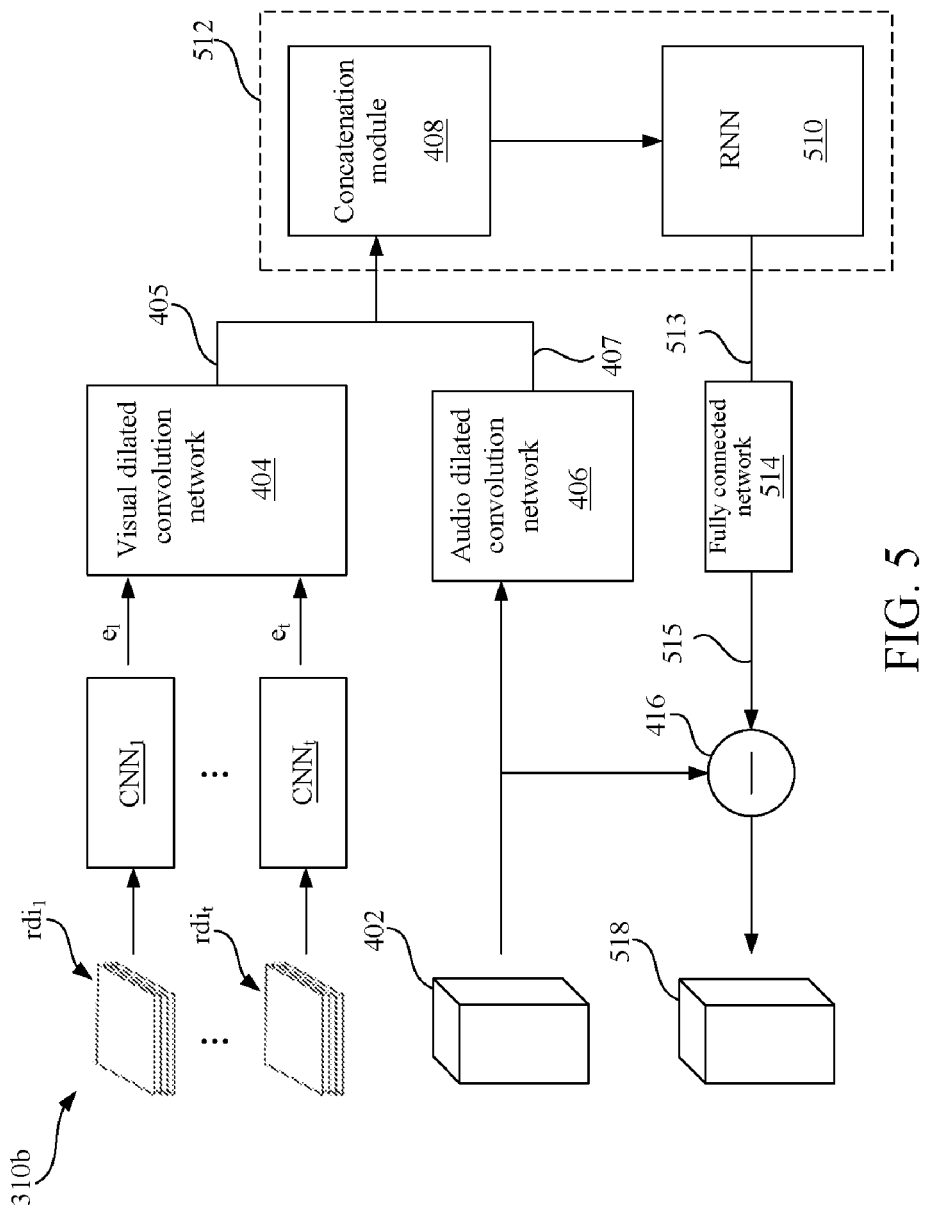
FIG. 5 is a block diagram illustrating a neural network model in the voice purification module in the voice-related system in accordance with another embodiment of the present disclosure.

FIG. 5 is a block diagram illustrating a neural network model 310b in the voice purification module 320 (shown in FIG. 3) in the voice-related system in accordance with another embodiment of the present disclosure. Compared to the neural network model 310a described with reference to FIG. 4, the neural network model 310b further includes a fully connected network 514 between an audio-visual fusion and correlation module 512 and the spectral subtraction module 416. Compared to the audio-visual fusion and correlation module 412 described with reference to FIG. 4, the audio-visual fusion and correlation module 512 in FIG. 5 includes an RNN 510 configured to determine an audio-visual representation 513 using correlation between the high-level visual features 405 and the high-level audio features 407. Correlated portions of the high-level audio features 407 and the high-level visual features 405 are reflected in the audio-visual representation. Alternatively, uncorrelated portions of the high-level audio features 407 and the high-level visual features 405 are reflected in the audio-visual representation 513. The fully connected network 514 is configured to determine a first spectrogram 515 using the audio-visual representation 513. The first spectrogram 515 is non-related with the images $rdi_1$ to $rdi_t$. The fully connected network 514 may be a multiple layer perceptron (MLP). A denoised spectrogram 518 is a result of subtracting the first spectrogram 515 from the noisy spectrogram 402. The denoised spectrogram 518 includes a purified frequency domain-related representation of the voice of the human 150.

Figure 6:
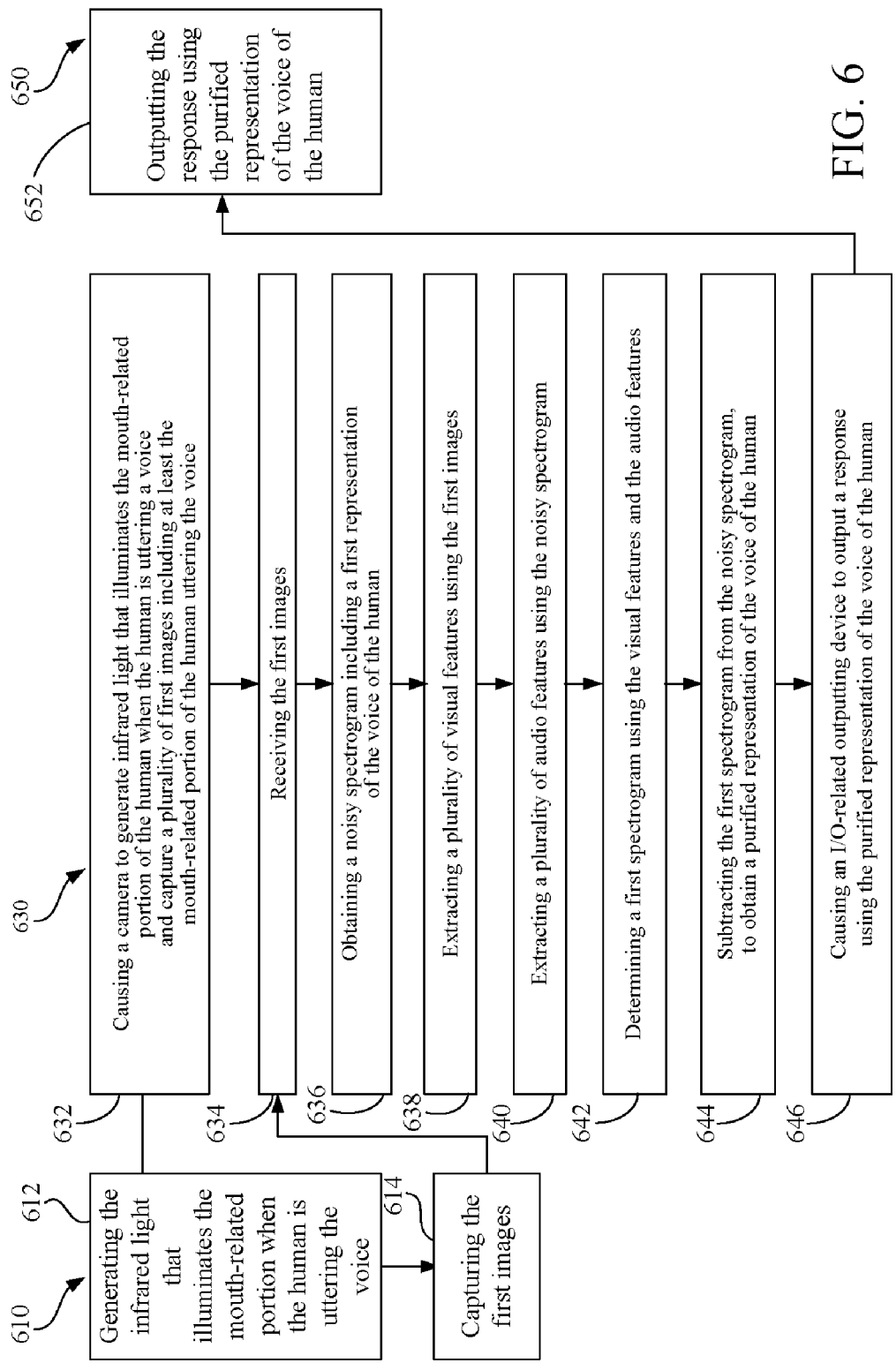
FIG. 6 is a flowchart illustrating a method for voice-related interaction in accordance with an embodiment of the present disclosure.

FIG. 6 is a flowchart illustrating a method for voice-related interaction in accordance with an embodiment of the present disclosure. Referring to FIGS. 1-6, the method for voice-related interaction includes a method 610 performed by the I/O-related inputting devices 122, a method 630 performed by the voice-related control device 124, and a method 650 performed by the I/O-related outputting devices 126. In step 632, a camera is caused to generate infrared light that illuminates the mouth-related portion when the human is uttering a voice and capture a plurality of first images including at least the mouth-related portion of the human uttering the voice by the camera control module 302. The camera is a depth camera 102. In step 612, the infrared light that illuminates the mouth-related portion when the human is uttering the voice is generated by the camera. In step 614, the first images are captured by the camera. In step 634, the first images are received from the camera by the video image pre-processing module 306. In step 636, a noisy spectrogram including a first representation of the voice of the human is obtained by the audio pre-processing module 308. In step 638, a plurality of visual features are extracted using the first images by the CNNs $CNN_1$ to $CNN_t$ and the visual dilated convolution network 404. In step 640, a plurality of audio features are extracted using the noisy spectrogram by the audio dilated convolution network 406. In step 642, a first spectrogram is determined using the visual features and the audio features by the audio-visual fusion and correlation module 412. Alternatively, in step 642, a first spectrogram is determined using the visual features and the audio features by the audio-visual fusion and correlation module 512 and the fully connected network 514. In step 644, the first spectrogram is subtracted from the noisy spectrogram by the spectral subtraction module 416, to obtain a purified representation of the voice of the human. In step 646, an I/O-related outputting device is caused to output a response using the purified representation of the voice of the human. When the I/O-related outputting device is the at least one antenna 114, the at least one antenna 114 is caused to generate the response by the antenna control module 314. When the I/O-related outputting device is the display 116, the display 116 is caused to generate the response by the display control module 316. When the I/O-related outputting device is the at least one speaker 118, the at least one speaker 118 is caused to generate the response by the speaker control module 318. In step 652, the response is output by the I/O-related outputting device using the purified representation of the voice of the human.

Alternatively, in step 632, at least one camera is caused to generate infrared light that illuminates the mouth-related portion of a human when the human is uttering a voice and capture a plurality of image sets including at least a mouth-related portion of the human uttering the voice by the camera control module 302. The at least one camera includes the depth camera 102 and the RGB camera 104. Each image set is $is_1, \ldots,$ or $is_t$ includes an image $di_1, \ldots,$ or $di_t$ and an image $ri_1, \ldots,$ or $ri_t$ in FIG. 2. In step 612, the infrared light that illuminates the mouth-related portion of the human when the human is uttering the voice is generated by the depth camera 102. In step 614, the image sets are captured by the depth camera 102 and the RGB camera 104. In step 634, the image sets are received from the at least one camera by the video image pre-processing module 306. In step 638, a plurality of visual features are extracted using the image sets by the CNNs $CNN_1$ to $CNN_t$ and the visual dilated convolution network 404.

Some embodiments have one or a combination of the following features and/or advantages. In an embodiment, a denoised audio is obtained by subtracting a first spectrogram from a noisy spectrogram including a first representation of a voice of a human, wherein the first spectrogram is determined using depth information of a plurality of images including a mouth-related portion of the human uttering the voice. Because spectral subtraction is a less expensive method than, for example, spectrogram mask multiplication in a related art, and the depth information improves accuracy of the first spectrogram, which is essential to the effectiveness of spectral subtraction, quality and/or intelligibility of the denoised audio is improved without substantial speed cost.

A person having ordinary skill in the art understands that each of the units, modules, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and module in the above-mentioned embodiment since the working processes of the above-mentioned system, device, and module are basically the same. For easy description and simplicity, these working processes will not be detailed.

It is understood that the disclosed system, device, and method in the embodiments of the present disclosure can be realized with other ways. The above-mentioned embodiments are exemplary only. The division of the modules is merely based on logical functions while other divisions exist in realization. It is possible that a plurality of modules or components are combined or integrated in another system. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules for display are or are not physical modules, that is, located in one place or distributed on a plurality of network modules. Some or all of the modules are used according to the purposes of the embodiments.

Moreover, each of the functional modules in each of the embodiments can be integrated in one processing module, physically independent, or integrated in one processing module with two or more than two modules.

If the software function module is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method, comprising:
   receiving, by at least one processor, a plurality of first images comprising at least a mouth-related portion of a human uttering a voice, wherein each first image has depth information;
   obtaining, by the at least one processor, a noisy spectrogram comprising a first representation of the voice of the human;
   extracting, by the at least one processor, a plurality of visual features using the first images, wherein one of the visual features is obtained using the depth information of a second image of the first images;
   extracting, by the at least one processor, a plurality of audio features using the noisy spectrogram;
   determining, by the at least one processor, a first spectrogram using the visual features and the audio features;
   subtracting, by the at least one processor, the first spectrogram from the noisy spectrogram, to obtain a purified representation of the voice of the human; and
   outputting, by an input/output (I/O)-related outputting device, a response using the purified representation of the voice of the human,
   wherein the first spectrogram is determined with correlation between the visual features and the audio features, and wherein the first spectrogram is non-related with the first images and reflects uncorrelated portions of the audio features and the visual features.

2. The method of claim 1, wherein the one of the visual features is obtained using depth information of a tongue of the human in the depth information of the second image of the first images.

3. The method of claim 1, further comprising:
   generating, by a camera, infrared light that illuminates the mouth-related portion when the human is uttering the voice; and
   capturing, by the camera, the first images.

4. The method of claim 1, wherein
   the step of receiving, by the at least one processor, the first images comprises:
      receiving a plurality of image sets, wherein each image set comprises a corresponding third image of the first images, and a corresponding fourth image, and the corresponding fourth image has color information augmenting the depth information of the corresponding third image; and
   the step of extracting, by the at least one processor, the visual features comprises:
      extracting the visual features using the image sets, wherein the one of the visual features is obtained using the depth information and the color information of a first image set of the image sets.

5. The method of claim 1, wherein the one of the visual features is obtained using depth information of a plurality of fifth images of the first images.

6. The method of claim 1, wherein the step of determining, by the at least one processor, the first spectrogram comprises:
   determining a second representation using correlation between the visual features and the audio features.

7. The method of claim 6, wherein
   the second representation is the first spectrogram; and
   the step of determining the second representation is performed by a recurrent neural network (RNN).

8. The method of claim 6, wherein
   the second representation is an audio-visual representation;
   the step of determining the second representation is performed by a recurrent neural network (RNN); and
   the step of determining, by the at least one processor, the first spectrogram further comprises:
      determining the first spectrogram using the second representation by a fully connected network.

9. A system, comprising:
   at least one memory configured to store program instructions;
   at least one processor configured to execute the program instructions, which cause the at least one processor to perform steps comprising:
      receiving a plurality of first images comprising at least a mouth-related portion of a human uttering a voice, wherein each first image has depth information;
      obtaining a noisy spectrogram comprising a first representation of the voice of the human;
      extracting a plurality of visual features using the first images, wherein one of the visual features is obtained using the depth information of a second image of the first images;
      extracting a plurality of audio features using the noisy spectrogram;
      determining a first spectrogram using the visual features and the audio features; and
      subtracting the first spectrogram from the noisy spectrogram, to obtain a purified representation of the voice of the human; and
   an input/output (I/O)-related outputting device configured to output a response using the purified representation of the voice of the human,
   wherein the first spectrogram is determined with correlation between the visual features and the audio features, and wherein the first spectrogram is non-related with the first images and reflects uncorrelated portions of the audio features and the visual features.

10. The system of claim 9, wherein the one of the visual features is obtained using depth information of a tongue of the human in the depth information of the second image of the first images.

11. The system of claim 9, further comprising:
    a camera configured to:
       generate infrared light that illuminates the mouth-related portion when the human is uttering the voice; and
       capture, by the camera, the first images.

12. The system of claim 9, wherein
    the step of receiving the first images comprises:
       receiving a plurality of image sets, wherein each image set comprises a corresponding third image of the first images, and a corresponding fourth image, and the corresponding fourth image has color information augmenting the depth information of the corresponding third image; and the step of extracting the visual features comprises:
extracting the visual features using the image sets, wherein the one of the visual features is obtained using the depth information and the color information of a first image set of the image sets.

13. The system of claim 9, wherein the one of the visual features is obtained using depth information of a plurality of fifth images of the first images.

14. The system of claim 9, wherein the step of determining the first spectrogram comprises:
determining a second representation using correlation between the visual features and the audio features.

15. The system of claim 14, wherein
the second representation is the first spectrogram; and
the step of determining the second representation is performed by a recurrent neural network (RNN).

16. The system of claim 14, wherein
the second representation is an audio-visual representation;
the step of determining the second representation is performed by an RNN; and
the step of determining the first spectrogram further comprises:
determining the first spectrogram using the second representation by a fully connected network.

17. A non-transitory computer-readable medium with program instructions stored thereon, that when executed by at least one processor, cause the at least one processor to perform steps comprising:
receiving a plurality of first images comprising at least a mouth-related portion of a human uttering a voice, wherein each first image has depth information;
obtaining a noisy spectrogram comprising a first representation of the voice of the human;
extracting a plurality of visual features using the first images, wherein one of the visual features is obtained using the depth information of a second image of the first images;
extracting a plurality of audio features using the noisy spectrogram;
determining a first spectrogram using the visual features and the audio features;
subtracting the first spectrogram from the noisy spectrogram, to obtain a purified representation of the voice of the human; and
causing an input/output (I/O)-related outputting device to output a response using the purified representation of the voice of the human,
wherein the first spectrogram is determined with correlation between the visual features and the audio features, and wherein the first spectrogram is non-related with the first images and reflects uncorrelated portions of the audio features and the visual features.

18. The non-transitory computer-readable medium of claim 17, wherein the one of the visual features is obtained using depth information of a tongue of the human in the depth information of the second image of the first images.

19. The non-transitory computer-readable medium of claim 17, wherein the steps further comprises:
causing a camera to generate infrared light that illuminates the mouth-related portion when the human is uttering the voice and capture the first images.

20. The non-transitory computer-readable medium of claim 17, wherein
the step of receiving the first images comprises:
receiving a plurality of image sets, wherein each image set comprises a corresponding third image of the first images, and a corresponding fourth image, and the corresponding fourth image has color information augmenting the depth information of the corresponding third image; and
the step of extracting the visual features comprises:
extracting the visual features using the image sets, wherein the one of the visual features is obtained using the depth information and the color information of a first image set of the image sets.

* * * * *